(12) United States Patent
Nishimura

(10) Patent No.: US 7,963,025 B2
(45) Date of Patent: Jun. 21, 2011

(54) METHOD OF MANUFACTURNG A STATOR FOR AN INNER ROTOR TYPE MOTOR

(75) Inventor: Shigeki Nishimura, Gifu (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 679 days.

(21) Appl. No.: 12/007,423

(22) Filed: Jan. 10, 2008

(65) Prior Publication Data

US 2008/0134491 A1 Jun. 12, 2008

Related U.S. Application Data

(62) Division of application No. 11/130,163, filed on May 17, 2005, now Pat. No. 7,489,061.

(30) Foreign Application Priority Data

Oct. 22, 2002 (JP) ................................. 2002-306918

(51) Int. Cl.
*H01F 7/06* (2006.01)
(52) U.S. Cl. ............................ 29/605; 29/596; 29/606
(58) Field of Classification Search .................... 29/596, 29/598, 605, 606, 732; 310/194, 214, 215, 310/216.009, 216.079, 254.1
See application file for complete search history.

(56) References Cited

U.S. PATENT DOCUMENTS

| 2,967,346 | A |   | 1/1961 | McMaster et al. | 29/155.5 |
| 3,626,219 | A |   | 12/1971 | Lease | 310/42 |
| 5,763,978 | A | * | 6/1998 | Uchida et al. | 310/215 |
| 6,476,533 | B2 |   | 11/2002 | Akutsu et al. | 310/259 |

OTHER PUBLICATIONS

Patent Abstracts of Japan, Publication No. 2000-358346, Dec. 26, 2000, Matsushita Seiko Co. Ltd.

* cited by examiner

*Primary Examiner* — Thiem Phan
(74) *Attorney, Agent, or Firm* — Kratz, Quintos & Hanson, LLP

(57) ABSTRACT

A stator for an inner rotor type motor includes a stator core 1, insulating members 10 and winding wire 3, 4. The stator core 1 includes: four divisional core elements 6 each integrally formed by setting up one tooth 2 to one yoke portion 8; and four divisional yoke elements 7. A rotor opening 11 is formed on top portions of the teeth 2 by arranging the divisional core elements 6 so that the teeth 2 are radially disposed. Four slots 9 are formed by respectively arranging the divisional yoke elements 7 between the yoke portions 8 of the adjacent divisional core elements 6. The winding wire 3, 4 is wound on the teeth 2. An inner surface of each yoke portion 8 is substantially perpendicular to the central axis of the corresponding tooth 2 while the insulating member 10 is provided on side surfaces of each tooth 2.

7 Claims, 11 Drawing Sheets

METHOD OF MANUFACTURNG A STATOR FOR AN INNER ROTOR TYPE MOTOR

CROSS-REFERENCE TO RELATED APPLICATIONS

This application is a division of U.S. patent application Ser. No. 11/130,163, filed on May 17, 2005 now U.S. Pat. No. 7,489,061, which application is based on Japanese Patent Application No. 2002-306918 filed Oct. 22, 2002, which is hereby expressly incorporated by reference herein in its entirety.

BACKGROUND OF THE INVENTION

1. Field of the Invention

The present invention relates to a stator for an inner rotor type motor and a method of manufacturing the same, which is constructed by circularly integrating a plurality of divisional core elements using a plurality of divisional yoke elements after winding wire is wound on each of the plurality of divisional core elements in series. In this case, the divisional core elements are obtained by dividing a stator core into the plural number.

2. Description of the Prior Art

Heretofore, as a method of manufacturing a stator of this type of inner rotor type motor, a method of manufacturing a stator which includes the steps of: respectively applying winding wire on a plurality of divisional core elements into which a stator core is divided; and arranging the divisional core elements in a circular manner is known (for example, Japanese Laid-open Patent Application No. 2000-358346).

Hereinafter, a stator of a conventional inner rotor type motor and a method of manufacturing the same will be described with reference to FIGS. 17 to 22.

As shown in these drawings, a stator 110 is manufactured by a method of manufacturing a stator of a conventional condenser motor (see FIG. 22). The method includes: a punching step of punching divisional core plates 103 each constructed by dividing a stator core 100 into twice the number of poles (herein, eight) (the same number as the number of slots) and each integrally formed from one yoke portion 101 having a circular arc surface on an outer circumference thereof and one tooth 102 in which a rotor facing surface is formed at inner surface side (see FIG. 18); a laminating step of forming divisional core elements 104 in which the predetermined number of divisional core plates 103 are laminated (see FIG. 19); an A phase winding wound step of forming the pole number of A phase winding wound elements 107 connected to each other by crossover wire 106-1 by winding A phase winding 106 on each of the teeth 103 of the pole number of divisional core elements 104 with concentrated winding via an insulating member 105 after arranging the pole number of divisional core elements 104 formed at the laminating step in a circular manner (see FIG. 20); a B phase winding wound step of forming the pole number of B phase winding wound elements 109 connected to each other by crossover wire 108-1 by winding B phase winding 108 on each of the teeth 103 of the pole number of divisional core elements 104 in a similar manner (see FIG. 21); and an assembling step of assembling the A phase winding wound elements 107 and the B phase winding wound elements 109 so as to arrange them alternately and circularly to fixedly integrate them (see FIG. 22).

In such a conventional method of manufacturing the stator 110, there is a problem that it is necessary to form the pole number of A phase winding (main winding) wound elements 107 connected to each other by the crossover wire 106-1 and the pole number of B phase winding (assistant winding) wound elements 109 connected to each other by the crossover wire 108-1 at separate steps and to integrate them by combining them in a circular manner. Further, there is an additional problem that at the process of integrating the A phase winding wound elements 107 with the B phase winding wound elements 109 in a circular manner, much time and effort is required for management of prevention against breaking of the respective crossover wires 106-1, 108-1 which respectively connect the pole number of A phase winding wound elements 107 and the pole number of B phase winding wound elements 109 to each other.

SUMMARY OF THE INVENTION

To solve the problems described above, it is therefore one object of the present invention to provide a stator for an inner rotor type motor and a method of manufacturing the same. The method does not require the step of integrating the A phase winding wound elements with the B phase winding wound elements to arrange them alternately and circularly by arranging twice the pole number of divisional core elements (herein, four) substantially radially and in a regular dimensions and placement for the stator and forming the pole number of A phase winding wound elements and the pole number of B phase winding wound elements. Further, the method can improve the quality of the stator because it is possible to prevent damage of the crossover wire such as breaking by holding the crossover wire with an insulating member (other insulating member) mounted on the A phase winding wound elements and the B phase winding wound elements. The stator can be assembled with small work because winding wire can be wound on the teeth of the stator core in series and with a simple winding operation of a winding machine.

In order to achieve the above object, in one aspect of the present invention, the present invention is directed to a stator for an inner rotor type motor which is constructed by winding wire on teeth of a stator core. The stator includes a stator core, insulating members; and winding wire. The stator core includes: four divisional core elements, each of the four divisional core elements being integrally formed by setting up one tooth to one yoke portion, wherein a rotor opening is formed on top portions of the four teeth by arranging the four divisional core elements so that the teeth are radially disposed; and four divisional yoke elements wherein four slots are formed by respectively arranging the four divisional yoke elements between the yoke portions of the adjacent divisional core elements. The insulating members are respectively provided on side surfaces of the teeth of the stator core. The winding wire is wound on each of the teeth of the stator core. In the stator of the present invention, an inner surface of the yoke portion of each of the four divisional core elements is substantially perpendicular to the central axis of the corresponding tooth while the insulating member is provided on the side surfaces of each of the teeth.

According to the present invention, since the inner surface of the yoke portion is to become the surface substantially perpendicular to the central axis of the corresponding tooth, it causes no trouble in the winding operation in series of the winding machine to the teeth of the stator core, whereby it is possible to wind the winding with a simple winding operation while centering on the central axis of each of the teeth of the stator core without placing a special winding guide apparatus. In other words, the inner surface of the yoke portion substantially perpendicular to the central axis of each of the teeth can prevent the winding from dropping out outside in a radial direction thereof, whereby it is possible to prevent quality of the winding and working property for assembling from lowering.

Further, in the stator for an inner rotor type motor of the present invention, it is preferable that the winding wire is wound on each of the teeth in an aligned manner.

According to the present invention, it is possible to reduce a circumference length of the winding and to prevent deterioration in quality due to distortion of the winding (copper wire).

In the stator for an inner rotor type motor of the present invention, it is preferable that outer and inner circumferential portions of each of the four divisional core elements are formed in a circular arc manner.

According to the present invention, it is possible to form a housing engaging portion provided on the outside diameter of the stator and a rotor opening provided on the inside diameter of the stator by utilizing the circular arc shape outer and inner circumferential portions of each of the divisional core elements and by arranging the divisional core elements radially.

In the stator for an inner rotor type motor of the present invention, it is preferable that outer and inner circumferential portions of each of the four divisional yoke elements are formed in a linear or substantially linear manner.

According to the present invention, since it is possible to reduce the length of a magnetic path (that is, a path for magnetic flux) in comparison with the case where the outer and inner circumferential portions of each of the divisional yoke elements are formed in a circular arc manner, it is possible to improve performance of the inner rotor type motor.

In the stator for an inner rotor type motor of the present invention, it is preferable that the insulating member includes slot insulating films and other insulating members, each of the slot insulating films being constructed so that faults including dropout thereof are prevented by the other insulating members.

According to the present invention, since the slot insulating film is held by a holding portion of the corresponding other insulating member, it is possible to prevent faults including dropout of the slot insulating film.

In another aspect of the present invention, the present invention is directed to a method of manufacturing a stator for an inner rotor type motor in which winding wire is wound on teeth of a stator core. In the method of manufacturing a stator for an inner rotor type motor of one embodiment according to the present invention, the stator core is constructed from four divisional core elements and four divisional yoke elements, and each of the four divisional core elements is integrally formed by setting up one tooth to one yoke portion. The method of the present invention includes the steps of: providing an insulating member on each of the four divisional core elements while the four divisional core elements and the four divisional yoke elements are divided; forming two A phase winding wound members and two B phase winding wound members on the four divisional core elements by winding A phase winding or B phase winding in series thereon after the insulating member providing step; and after winding wound member forming step, constructing the stator core including a rotor opening formed on top portions of the four teeth and four slots each formed at a space encircled with the yoke portions of the adjacent divisional core elements and the corresponding divisional yoke element by arranging each of the four divisional yoke elements between the divisional core element constituting the A phase winding wound member and the divisional core element constituting the B phase winding wound member to integrate the four divisional core elements and the four divisional yoke elements in a circular manner.

According to the present invention, a winding machine can wind the winding on the teeth of the stator core in series when winding the winding on the teeth of the divisional core elements constituting the stator core, and it is possible to wind the winding on the teeth with a simple winding operation while centering on the central axis of each of the teeth of the stator core.

In the method of manufacturing a stator for an inner rotor type motor of the present invention, it is preferable that an inner surface of the yoke portion of each of the four divisional core elements is substantially perpendicular to the central axis of the corresponding tooth.

According to the present invention, it is possible to provide the insulating member on the stator core while the divisional yoke elements are removed. Further, since the inner surface of the yoke portion of each divisional core element is to become the surface substantially perpendicular to the central axis of the corresponding tooth, it causes no trouble in the winding operation in series of the winding machine to the teeth of the divisional core elements, whereby it is possible to wind the winding with a simple winding operation while centering on the central axis of each of the teeth of the stator core without placing a special winding guide apparatus. In other words, the inner surface of the yoke portion substantially perpendicular to the central axis of each of the teeth can prevent the winding from dropping out outside in a radial direction thereof, whereby it is possible to prevent quality of the winding and working property for assembling from lowering. Further, since it is possible to reduce the length of a magnetic path (that is, a path for magnetic flux) in comparison with the case where the outer and inner circumferential portions of each of the divisional yoke elements are formed in a circular arc manner, it is possible to improve performance of the inner rotor type motor.

In the method of manufacturing a stator for an inner rotor type motor of the present invention, it is preferable that outer and inner circumferential portions of each of the four divisional yoke elements are formed in a linear or substantially linear manner.

According to the present invention, since it is possible to reduce the length of a magnetic path (that is, a path for magnetic flux) in comparison with the case where the outer and inner circumferential portions of each of the divisional yoke elements are formed in a circular arc manner, it is possible to improve performance of the inner rotor type motor.

In a method of manufacturing a stator for an inner rotor type motor of another embodiment according to the present invention, winding wire is wound on teeth of a stator core, the stator core is constructed from four divisional core elements and four divisional yoke elements, and each of the four divisional core elements is integrally formed by setting up one tooth to one yoke portion. The method includes the steps of: providing an insulating member on the tooth of each of the four divisional core elements so that an inner surface of the yoke portion of each of the four divisional core elements is substantially perpendicular to the central axis of the corresponding tooth; circularly fastening the four divisional core elements in a manner that the teeth are arranged substantially radially and in a regular placement that the four teeth are placed at the same positions as or similar positions to the regular dimensions for inside and outside diameters after completion of the stator for the inner rotor type motor, whereby a rotor opening is formed on top portions of the four teeth; winding two-pole A phase winding and two-pole B phase winding on predetermined teeth in series and with concentrated winding; and forming four slots by respectively arranging the four divisional yoke elements between the yoke portions of the adjacent divisional core elements.

According to the present invention, it causes no trouble in the winding operation in series of the winding machine to the teeth of the stator core, whereby it is possible to wind the winding with a simple winding operation while centering on the central axis of each of the teeth of the stator core without placing a special winding guide apparatus. In other words, the inner surface of the yoke portion substantially perpendicular to the central axis of each of the teeth can prevent the winding from dropping out outside in a radial direction thereof, whereby it is possible to prevent quality of the winding and working property for assembling from lowering. Further, since the winding is wound on the teeth while all the divisional core elements are fastened in a manner that the teeth are arranged substantially radially and in a regular placement that the four teeth are placed at the same positions as or similar positions to the regular dimensions for inside and outside diameters after completion of the stator for the inner rotor type motor, it is possible to integrate the stator core by moving only the divisional yoke elements in the inside diameter direction or the vertical (up-and-down) direction thereof without widely moving the divisional core elements from the winding process to the completion of the stator. Moreover, since it is possible to integrate the divisional core elements into the stator core without widely moving the crossover wire for each pole winding, it is possible to manage such a process easily and to prevent breaking of the winding and the crossover wire or damage of a copper wire film thereof and the like, whereby it is possible to ensure the quality of the stator and the stator winding.

In the method of manufacturing a stator for an inner rotor type motor of the present invention, it is preferable that the winding wire is wound on each of the teeth in an aligned manner.

According to the present invention, it is possible to reduce a circumference length of the winding and to prevent deterioration in quality due to distortion of the winding (copper wire).

In the method of manufacturing a stator for an inner rotor type motor of the present invention, it is preferable that in the insulating member providing step slot insulating films and other insulating members are used as the insulating member, and the slot insulating films provided on the slots are held during the winding step.

According to the present invention, in the insulating member providing step, for example, a piece of slot insulating film is provided for each slot so that both end portions of the slot insulating film are overlapped in the vicinity of the center of an outer circumferential opening of the slot. Then, the winding is wound on the tooth while the near end portion of each of the two slot insulating films provided at both sides of the tooth of the divisional core element on which the winding is to be wound is deformed outwardly from the rotor opening and the far end portion of each of the two slot insulating films is held so as to be deformed outwardly from the rotor opening. Therefore, even in the case where each of the slot insulating films is provided so that the both end portions thereof overlap in the vicinity of the center of the outer circumferential opening of the slot because the length of the slot insulating film is longer than the length of the circumferential direction of the slot, it is possible to wind the winding with a simple winding operation while centering on the central axis of each of the teeth of the stator core.

In the method of manufacturing a stator for an inner rotor type motor of the present invention, it is preferable that each of the slot insulating films is constructed so that faults including dropout thereof are prevented by the other insulating members.

According to the present invention, since the slot insulating film is held by a holding portion of the corresponding other insulating member, it is possible to prevent faults including dropout of the slot insulating film.

In the method of manufacturing a stator for an inner rotor type motor of the present invention, it is preferable that in the insulating member providing step one slot insulating film is used for each of the four slots as the insulating member, an outer circumferential opening is arranged at the position where each of the divisional yoke elements is to be arranged in the fastening step, and both end portions of each of the slot insulating films are arranged near the center of the outer circumferential opening of the corresponding slot so that the adjacent end portions of each of the slot insulating films are overlapped with a predetermined length or more, and that the end portions of each of the slot insulating films are deformed outwardly from the rotor opening during the winding step.

According to the present invention, even in the case where each of the slot insulating films is provided so that the both end portions thereof overlap in the vicinity of the center of the outer circumferential opening of the slot because the length of the slot insulating film is longer than the length of the circumferential direction of the slot, it is possible to wind the winding with a simple winding operation while centering on the central axis of each of the teeth of the stator core.

In the method of manufacturing a stator for an inner rotor type motor of the present invention, it is preferable that the end portions of each of the slot insulating films are overlapped and held after all the winding wire is completely wound.

According to the present invention, when the divisional yoke elements are moved from the outside diameter direction to the inside diameter direction or in the vertical (up-and-down) direction thereof after all the winding is completely wound, the stator is assembled so that the divisional yoke elements are moved and pushed while holding the slot insulating films so that the both end portions of each of the slot insulating films are overlapped. Therefore, it is possible to ensure the insulation distance between the winding and the stator core without inserting a special insulating wedge or the like to the outer circumferential side of the slot.

In the method of manufacturing a stator for an inner rotor type motor of the present invention, it is preferable that the winding wire is wound on each of the teeth so as not to protrude onto the position where each of the four divisional yoke elements is to be arranged.

According to the present invention, since the winding is wound so as not to protrude into the space where the divisional yoke elements are to be placed, it is possible to facilitate the assembling of the divisional yoke elements after completion of the winding step.

BRIEF DESCRIPTION OF THE DRAWINGS

The foregoing and other objects, features and advantages of the present invention will become more readily apparent from the following detailed description of preferred embodiments of the invention which proceeds with reference to the accompanying drawings.

DETAILED DESCRIPTION OF THE INVENTION

Hereinafter, preferred embodiments of the present invention will now be described with reference to the accompanying drawings.

Figure 1:
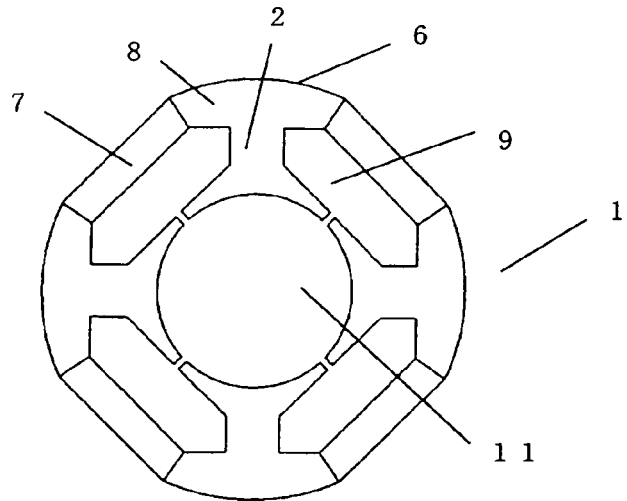
FIG. 1 is a front view of a stator core of an inner rotor type motor in one embodiment of the present invention.
Figure 2:
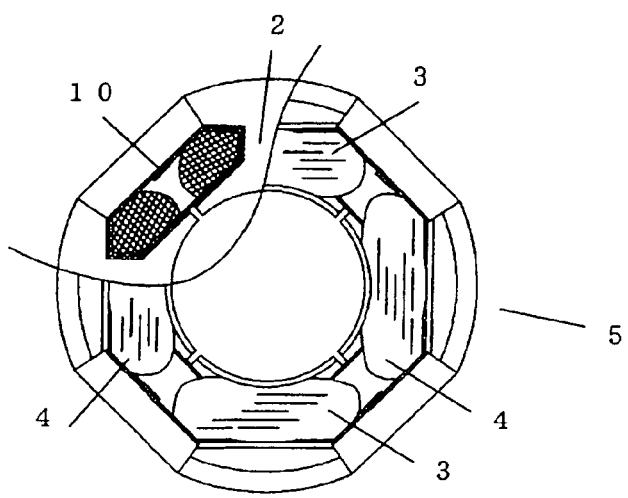
FIG. 2 is a fragmentary cross sectional view of a stator of the inner rotor type motor in one embodiment of the present invention.
Figure 3:
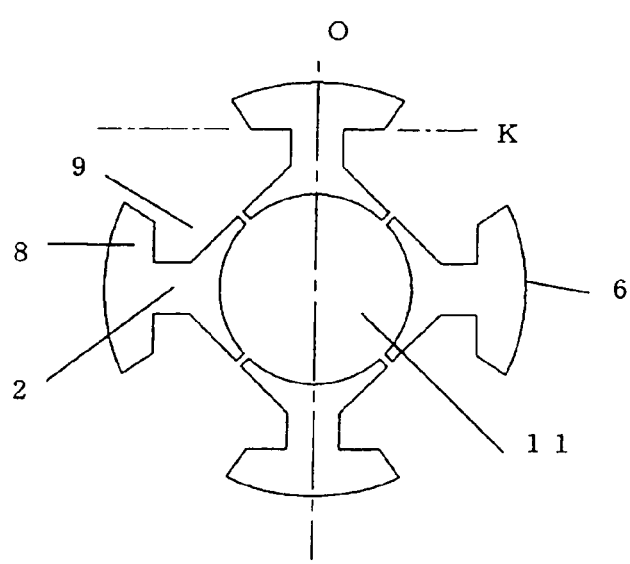
FIG. 3 is a front view of four divisional core elements of the stator core in the inner rotor type motor shown in FIG. 1.

A structure of a stator for an inner rotor type motor of the present invention will first be described with reference to FIGS. 1 to 6. As shown in FIGS. 1 and 2, a stator 5 is formed by winding an A phase winding 3 or a B phase winding 4 on each of four teeth 2 of a stator core 1 so that the A phase winding 3 is wound on the tooth 2 of each of two divisional core elements 6 that face to each other and the B phase winding 4 is wound on the tooth 2 of each of two divisional core elements 6 that face to each other and are respectively separated from the two divisional core elements 6 for the A phase winding 3 with electrical angle of 90°. The stator core 1 is constructed from four divisional core elements 6 in each of which outer and inner circumferential portions thereof are formed in a circular arc manner, and four divisional yoke elements 7 in each of which outer and inner circumferential portions thereof are formed in a linear or substantially linear manner (see FIGS. 5 and 6). Further, each of the divisional core elements 6 is integrally formed by setting up one tooth 2 to one yoke portion 8. A rotor opening 11 and four slots 9 are formed by arranging the four divisional core elements 6 so that each of the teeth 2 is radially disposed with respect to the center of the stator 5 and by respectively arranging the four divisional yoke elements 7 between the yoke portions 8 of the adjacent divisional core elements 6 (see FIG. 1). The stator 5 is constructed so that an inner surface K of the yoke portion 8 of each of the four divisional core elements 6 is substantially perpendicular to the central axis O of the corresponding tooth 2 while the insulating member is provided on the side surfaces of each of the teeth 2 (see FIG. 3).

Figure 4A:
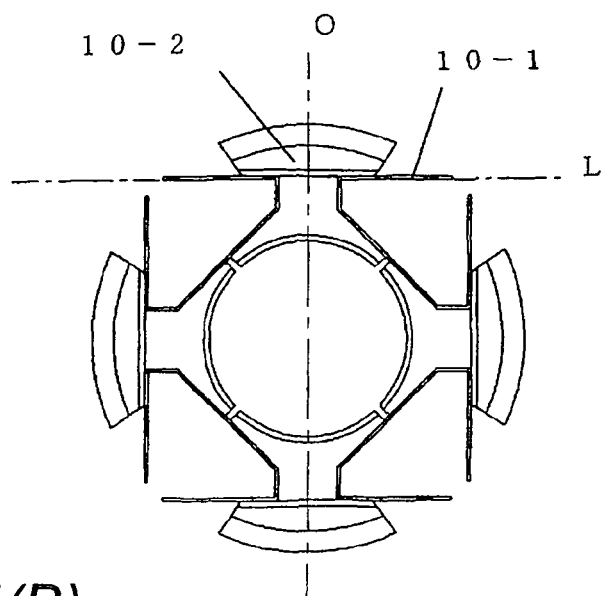
FIGS. 4A-4C are front views which show a state where insulating members are provided on the divisional core elements.

Further, as shown in FIG. 2, insulating members 10 are provided at the space of the tooth 2 where the A phase winding 3 or the B phase winding 4 is wound. In this regard, as shown in FIG. 4A, the insulating member 10 is formed from a slot insulating film 10-1 and other insulating member 10-2. Each of the inner surface K of the yoke portion 8, a surface of the other insulating member 10-2 on the inner surface of the yoke portion 8 and an inner surface L of the slot insulating film 10-1 is formed so as to become a surface substantially perpendicular to the central axis O of the corresponding tooth 2. The A phase winding 3 or the B phase winding 4 wound on each of the teeth 2 of the divisional core elements 6 is wound in a aligned manner along the inner surface L of the corresponding slot insulating film 10-1 substantially perpendicular to the central axis O of the tooth 2. This makes it possible to prevent crossing or turbulence of the winding from occurring, and reduce the length of the winding. Therefore, it is possible to prevent deterioration in quality of the stator for an inner rotor type motor due to distortion of the winding (copper wire).

Figure 4B:
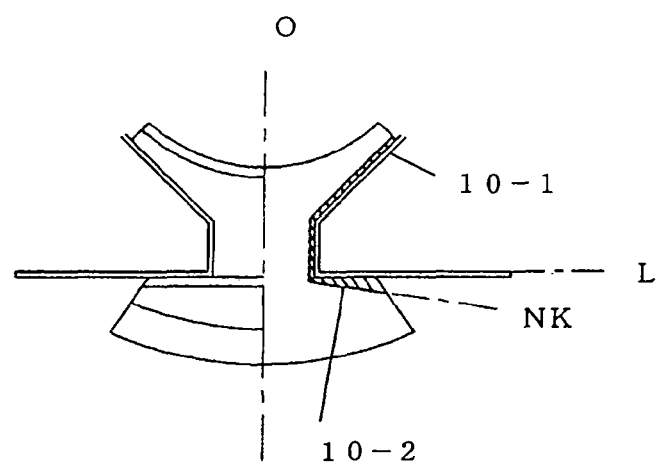
Figure 4C:
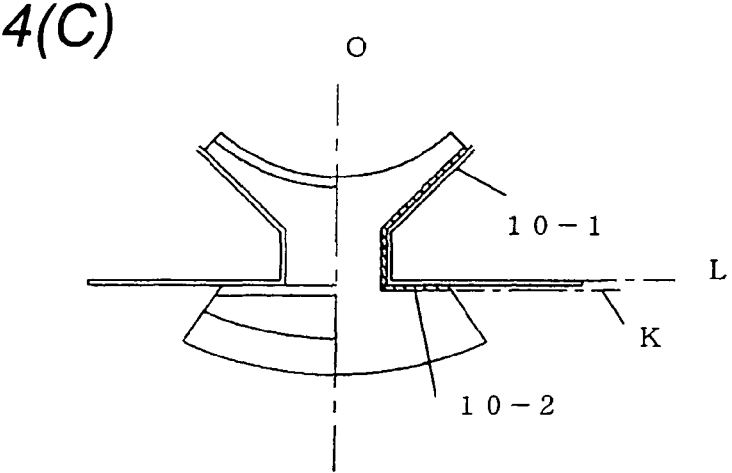
Figure 5:
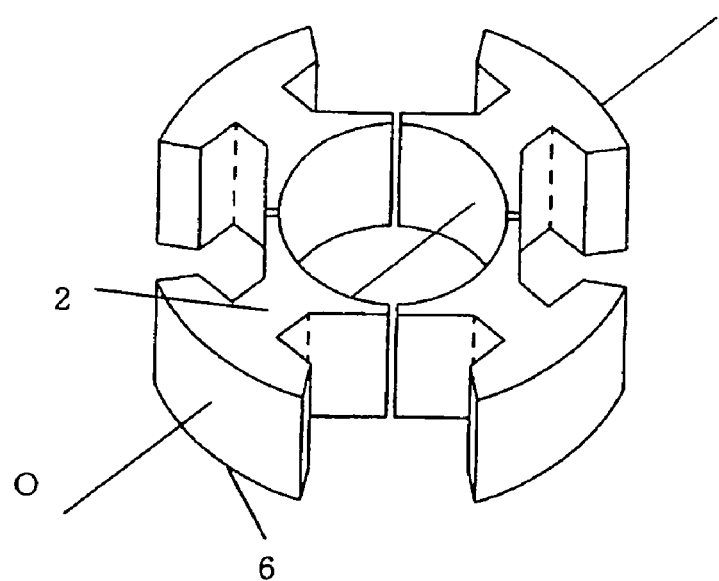
FIG. 5 is a perspective view of the four divisional core elements of the stator core in the inner rotor type motor.
Figure 6:
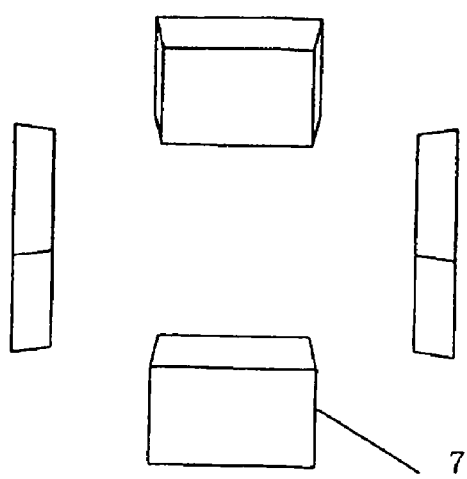
FIG. 6 is a perspective view of four divisional yoke elements of the stator core in the inner rotor type motor.
Figure 7:
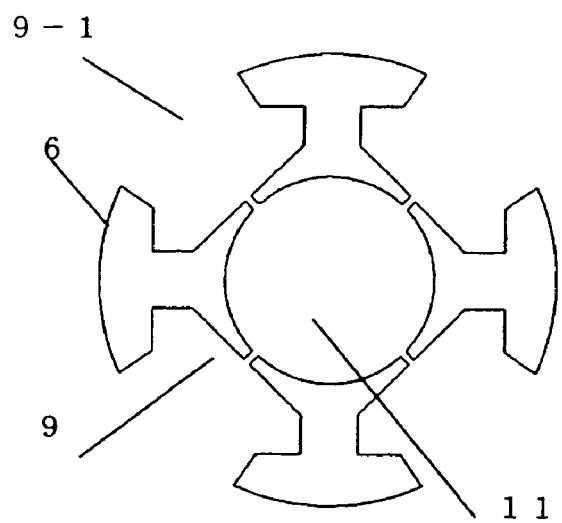
FIG. 7 is a front view of the four divisional core elements which are placed at the same positions as the regular dimensions for inside and outside diameters of the stator core of the inner rotor type motor in one embodiment of the present invention.

In this regard, the stator for an inner rotor type motor of the present invention may be constructed so that the inner surface L of the slot insulating film 10-1 is formed as a surface substantially perpendicular to the central axis O of the tooth 2. In other words, both the inner surface K of the yoke portion 8 and the inner surface L of the slot insulating film 10-1 may form surfaces substantially perpendicular to the central axis O of the tooth 2 as shown in FIG. 4C. Alternatively, even in the case where an inner surface NK of the yoke portion 8 does not form a surface substantially perpendicular to the central axis O as shown in FIG. 4B, the inner surface L of the slot insulating film 10-1 may form a surface substantially perpendicular to the central axis O by adjusting the thickness of a portion abutting on the yoke portion 8 of the other insulating member 10-2. In this case, the slot insulating film 10-1 has an even thickness over the entire slot insulating film 10-1.

Further, although the case where the insulating member 10 is constructed from the slot insulating film 10-1 and the other insulating member 10-2 has been described as an example in this embodiment, the present invention is not limited thereto. The insulating member 10 may be constructed from only the slot insulating film 10-1 or only the other insulating member 10-2. Alternatively, the insulating member 10 may be constructed by mold-forming the main portion of the divisional core element with an insulating member (insulating material).

Since the inner surface K of the yoke portion 8 of the divisional core element 6 is formed as a surface substantially perpendicular to the central axis O of the tooth 2 in the structure described above, the slot insulating film 10-1 is provided and fixed on an inner circumferential wall of the slot 9 along the inner surface K (or NK) of the yoke portion 8 via the other insulating member 10-2. Therefore, when winding the A phase winding 3 and the B phase winding 4 in series on the teeth 2 of the divisional core elements 6 constituting the stator core 1, a winding machine (not shown) rotates the stator core 1 while centering on the central axis O of each of the teeth 2 of the stator core 1. Thus, there is no trouble in the winding operation to the teeth 2 in series, and it is possible to wind the winding on the teeth 2 of the divisional core elements 6 without the need to provide a special winding guide apparatus or the like. The inner surface K of the yoke portion 8 or the inner surface L of the slot insulating film 10-1 constituting a surface substantially perpendicular to the central axis O of the corresponding tooth 2 can prevent the A phase winding 3 and the B phase winding 4 wound in series from dropping out outside in a radial direction thereof, and it is possible to wind the winding in an aligned manner while preventing crossing or turbulence of the wound winding from occurring. Therefore, it is possible to reduce the circumference length of the winding. As a result, it is possible to reduce the value of resistance of the winding. Further, it is possible to prevent damage of the film of the winding and deterioration in quality due to distortion of the winding. As a result, it is possible to improve the performance of the inner rotor type motor. Moreover, by circularly arranging the four divisional core elements 6 in which the outer and inner circumferential portions of each of the divisional core elements 6 are formed in a circular arc manner, the outer and inner circumferential portions can form a housing engaging portion provided on the outside diameter of the stator 5 and the rotor opening 11 provided on the inner diameter of the stator 5, respectively. Furthermore, by forming the outer and inner circumferential portions of each of the four divisional yoke elements 7 in a linear or substantially linear manner, it is possible to shorten the length of a magnetic path (that is, a path for magnetic flux) in comparison with the case where the outer and inner circumferential portions of each of the divisional yoke elements 7 are formed in a circular arc manner, and this makes it possible to improve the performance of the inner rotor type motor.

Figure 8:
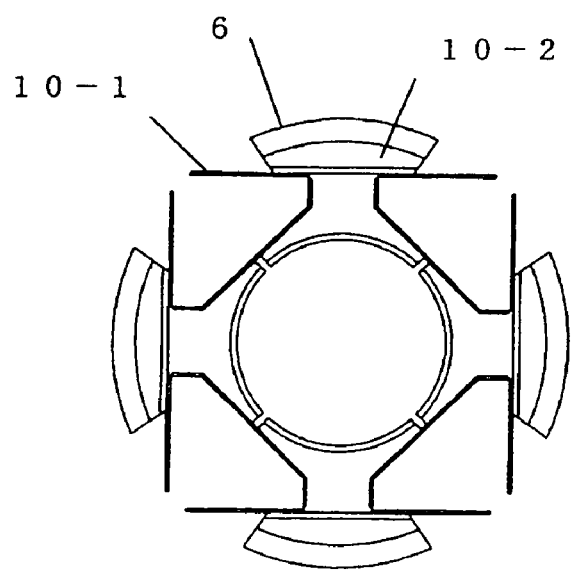
FIG. 8 is a front view which shows a state where insulating members are provided on the divisional core elements.
Figure 9:
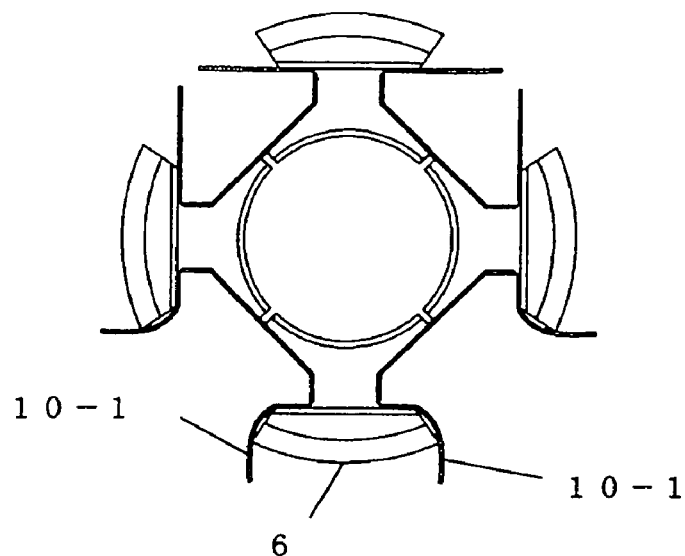
FIG. 9 is a front view which shows a state where necessary portions of end portions of the insulating member provided on the divisional core element are deformed outwardly.

Next, a method of manufacturing the stator for an inner rotor type motor of the present invention will now be described with reference to FIGS. 7 to 16. The four divisional core elements 6 each integrally constructed from the tooth 2 and the yoke portion 8 are arranged so that a rotor opening 11 is formed from top portions (i.e., inner surfaces) of the four teeth 2, four slots 9 and four outer circumferential openings 9-1 are formed from the adjacent divisional core elements 6, and the teeth 2 are arranged radially (see FIG. 7). The slot insulating film 10-1 and the other insulating member 10-2 are provided on each of the four divisional core elements 6 and the four slots 9 while dividing the stator core 5 into the four divisional core element 6 and the four divisional yoke element 7 (see FIG. 8). In this case, as shown in FIG. 8, it is preferable to provide the slot insulating films 10-1 so that both portions of each of the slot insulating films 10-1 are disposed in the vicinity of the center of the outer circumferential opening 9-1 of the corresponding slot 9 and both end portions of each of the slot insulating films 10-1 mutually overlap with a predetermined length or more. The both portions of each of the two corresponding slot insulating films 10-1 of the adjacent two slots 9 are temporarily deformed (folded) to the outward of the stator core 1 (see FIG. 9). Thus, even in the case where the length of the slot insulating film 10-1 is longer than the circumference length of the slot 9 and the both end portions of the slot insulating film 10-1 are provided so as to be overlapped in the vicinity of the center of the outer circumferential opening 9-1 of the corresponding slot 9, the A phase winding 3 or the B phase winding 4 can be easily wound in series on each of the teeth 2 with a simple winding operation while centering on the central axis O of each of the teeth 2 of the stator core 5.

Figure 10:
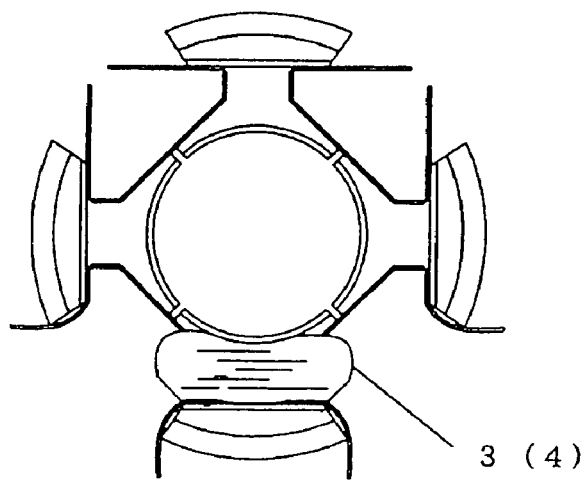
FIG. 10 is a front view which shows a state where one A phase winding (or B phase winding) is wound on one pole of the divisional core elements.
Figure 11:
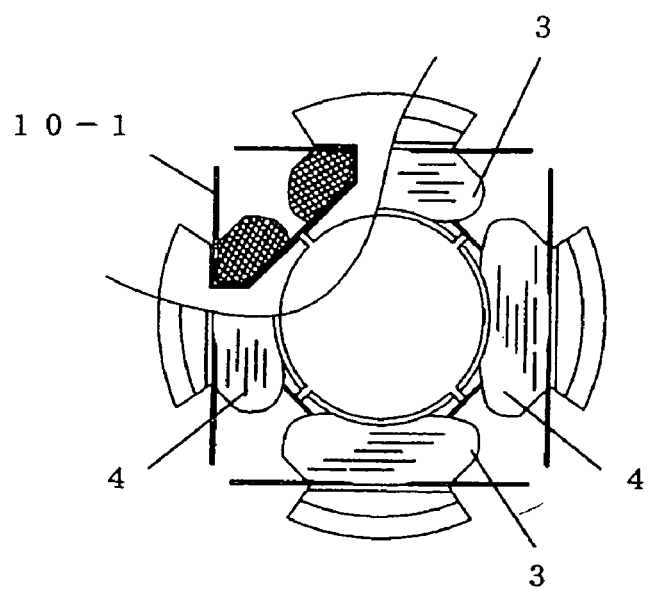
FIG. 11 is a fragmentary cross sectional view which shows a state where all the A phase windings and the B phase windings are wound on all poles.
Figure 12:
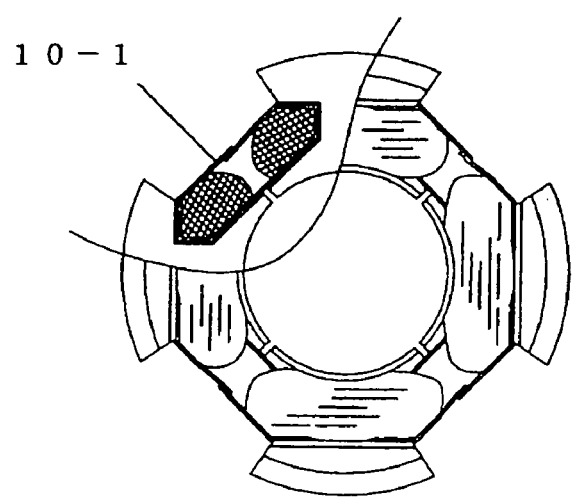
FIG. 12 is a fragmentary cross sectional view which shows a state where the insulating members are pushed and deformed in an inside diameter direction of the stator.

The A phase winding 3 or the B phase winding 4 is then wound on each of the teeth 2 of the divisional core elements 6 in turn (See FIG. 10). When the winding of the A phase winding 3 or the B phase winding 4 as described above to the teeth 2 of the four divisional core elements 6 is completed (see FIG. 11), each of the slot insulating films 10-1 is and held so that the end portions of each of the slot insulating films 10-1 are overlapped by folding the end portions of each of the slot insulating films 10-1 in the inside diameter direction or directly pressing the slot insulating films 10-1 by the respective divisional core elements 6 (see FIG. 12). Thus, when the divisional yoke elements 7 are moved from the outside diameter direction to the inside diameter direction or in the vertical (up-and-down) direction thereof after all the winding is completely wound, the stator 5 is assembled so that the divisional yoke elements 7 are moved and pushed while holding the slot insulating films 10-1 so that the both end portions of each of the slot insulating films 10-1 are overlapped. Therefore, it is possible to ensure the insulation distance between the winding and the stator core 1 without inserting a special insulating wedge or the like to the outer circumferential side of the slot 9. Further, by adjusting the length of overlapping portion of the end portions of the slot insulating film 10-1 if needed, it is possible to ensure the insulation distance even in a motor having any specification. Then, by respectively arranging the divisional yoke elements 7 between the yoke portions 8 of the adjacent divisional core elements 6 to integrate them, the stator core 1 constructed from the four slots 9 and the four teeth 2 is completed as shown in FIG. 2.

As described above, in the method of manufacturing a stator for an inner rotor type motor, it is possible to provide the insulating members 10 while the divisional yoke elements 7 are removed. Further, since the inner surface of the yoke portion 8 of each of the divisional core elements 6 is to become the surface substantially perpendicular to the central axis O of the corresponding tooth 2, it causes no trouble in the winding operation in series of the winding machine (not shown in the drawings) to the teeth 2 of the stator core 1 while winding in series to the divisional core elements 6, whereby it is possible to wind the winding with a simple winding operation while centering on the central axis O of each of the teeth 2 of the stator core 1 without placing a special winding guide apparatus. In other words, the inner surface of the yoke portion 8 substantially perpendicular to the central axis O of each of the teeth 2 can prevent the winding from dropping out outside in a radial direction thereof, whereby it is possible to prevent quality of the winding and working property for assembling from lowering.

In this regard, in the method of manufacturing the stator for an inner rotor type motor of the present invention, only the four divisional core elements 6 may be circularly fastened in a manner that the teeth 2 are arranged substantially radially and in a regular placement that the four teeth 2 are placed at the same positions as or similar positions to the regular dimensions for inside and outside diameters after completion of the stator 5 for the inner rotor type motor, and the insulating members 10 may be provided on the teeth 2, and then two A phase windings 3 and two B phase windings 4 may be respectively wound on predetermined teeth 2 in series. Since the winding is wound on the teeth 2 while all the divisional core elements 6 are fastened in a manner that the teeth 2 are arranged substantially radially and in a regular placement that the four teeth 2 are placed at the same positions as or similar positions to the regular dimensions for inside and outside diameters after completion of the stator 5 for the inner rotor type motor, it is possible to integrate the stator core 1 by moving only the divisional yoke elements 7 in the inside diameter direction or the vertical (up-and-down) direction thereof without widely moving the divisional core elements 6 from the winding process to the completion of the stator 5. Further, since it is possible to integrate the divisional core elements 6 into the stator core 1 without widely moving the crossover wire for each pole winding, it is possible to manage such a process easily and to prevent breaking of the winding and the crossover wire or damage of a copper wire film thereof and the like, whereby it is possible to ensure the quality of the stator 5 and the stator winding. Moreover, it is possible to assemble the stator 5 with small time and effort.

Figure 13:
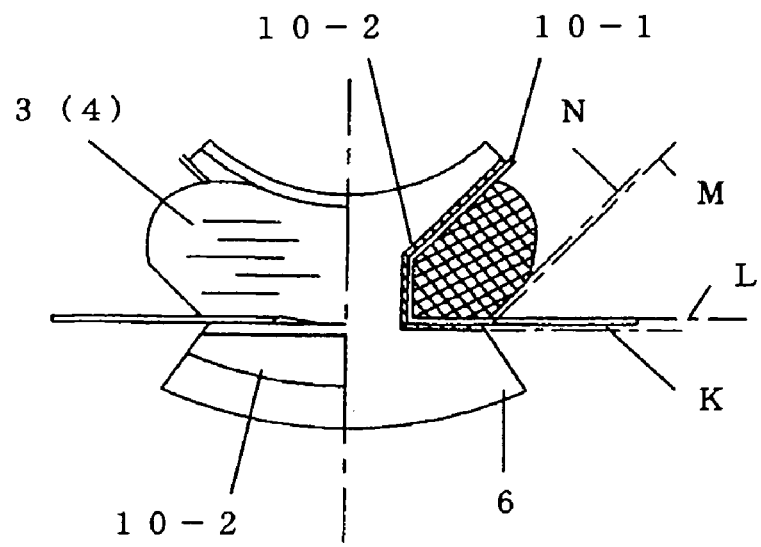
FIG. 13 is a partly enlarged cross sectional view of a state where a winding is wound on one divisional core element.

Next, the state where the winding is wound on the teeth 2 of the divisional core elements 6 will now be described with reference to FIG. 13. In the winding process of the A phase winding 3 or the B phase winding 4 onto the teeth 2 of the divisional core elements 6, it is preferable that the winding is wound substantially along the inner surface M of the divisional yoke element 7 where the both outer circumferential surfaces of the A phase winding 3 or the B phase winding 4 with respect to the central axis of the divisional core element 6 are placed, so that the winding does not protrude into the position where the divisional yoke element 7 is to be placed (i.e., inner surface M) and the position where the slot insulating films 10-1 are to be folded (i.e., inner surface N). Since the A phase winding 3 or the B phase winding 4 does not interfere in arranging the divisional yoke element 7 between the yoke portions 8 of the adjacent divisional core elements 6 by winding the winding in this manner, it is possible to provide the divisional yoke elements 7 easily after completing the winding step with small power and without damaging the wound winding.

Figure 14:
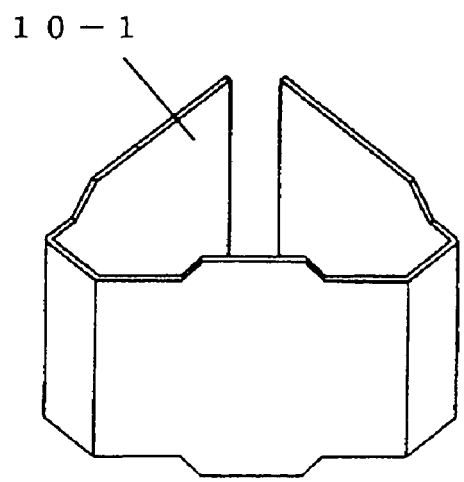
FIG. 14 is a perspective view which shows a state where an insulating member (slot insulating film) of the inner rotor type motor in one embodiment of the present invention is folded.
Figure 15:
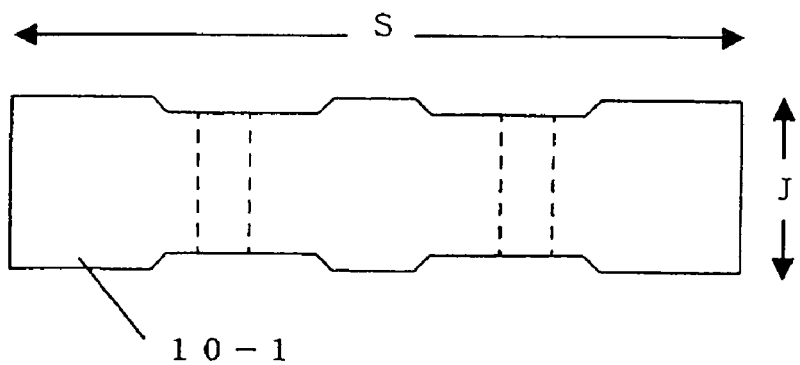
FIG. 15 is a front view of the insulating member (slot insulating film).
Figure 16:
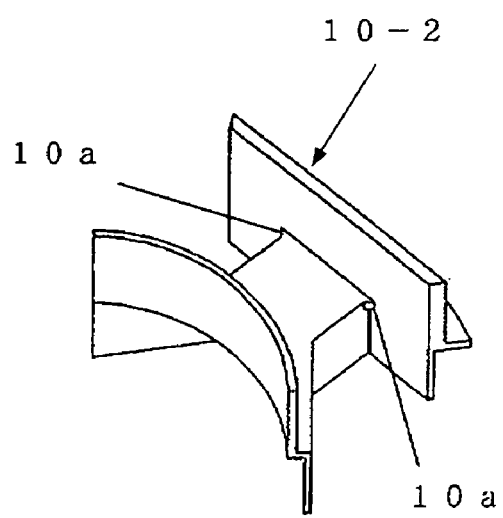
FIG. 16 is a perspective view of the insulating member (other insulating member).
Figure 17:
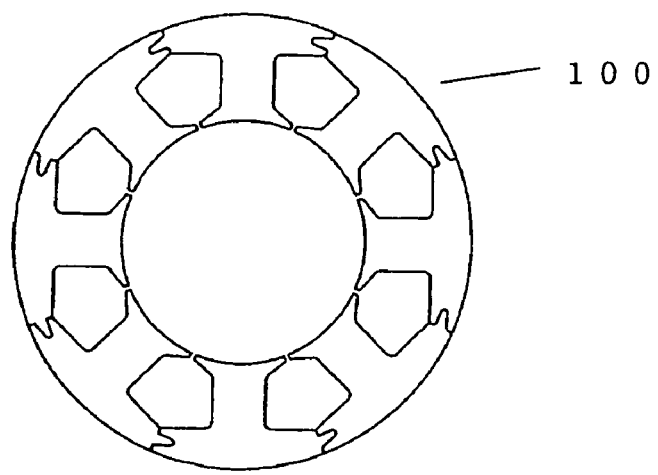
FIG. 17 is a front view of a stator core in a conventional inner rotor type motor.
Figure 18:
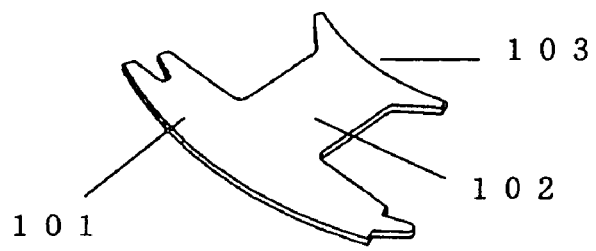
FIG. 18 is a perspective view of a divisional core plate of the conventional inner rotor type motor shown in FIG. 17.
Figure 19:
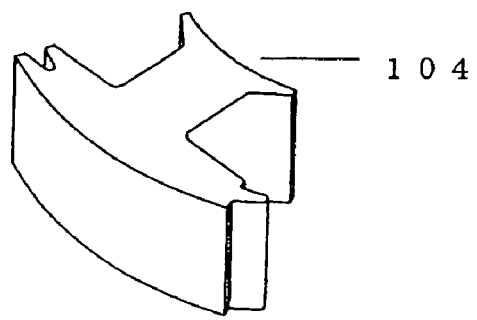
FIG. 19 is a perspective view of a divisional core element in which the predetermined pieces of divisional core plates are laminated.
Figure 20:
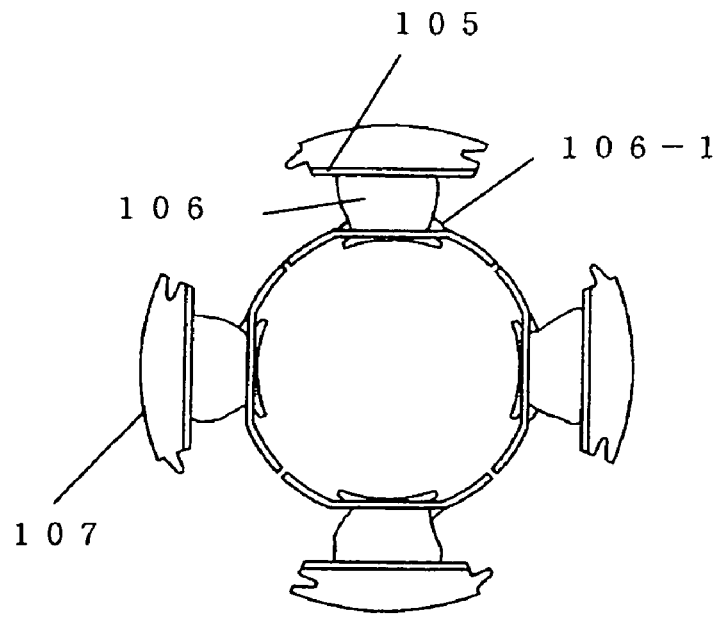
FIG. 20 is a front view which shows a state where a main winding is wound on four poles of divisional core elements to form main winding wound members.
Figure 21:
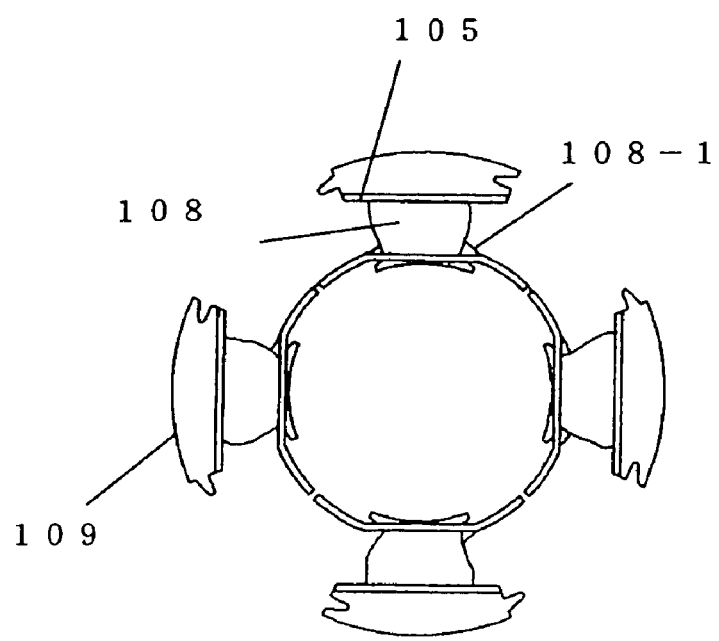
FIG. 21 is a front view which shows a state where an assistant winding is wound on four poles of divisional core elements to form assistant winding wound members.
Figure 22:
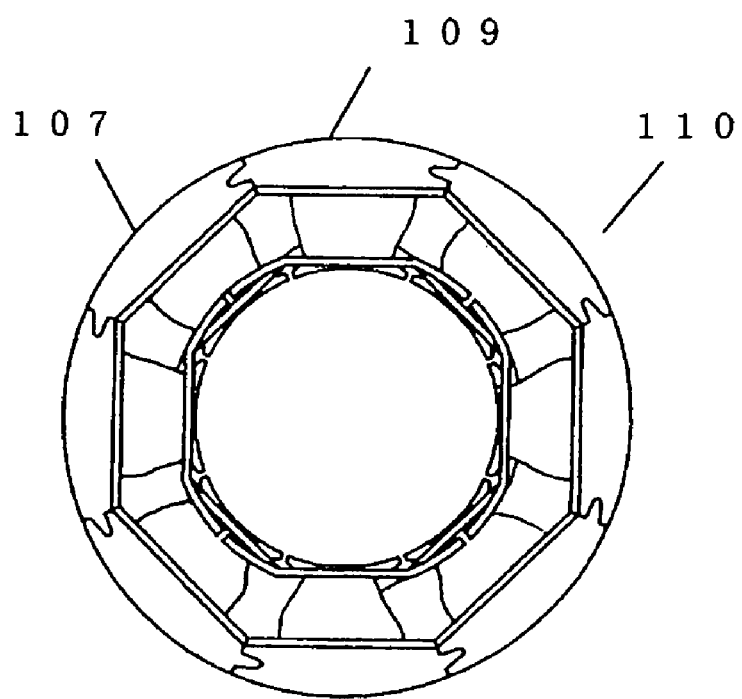
FIG. 22 is a front view which shows a state where the main winding wound members and the assistant winding wound members are arranged alternately to be integrated in a circular manner.

Next, the structure of the slot insulating film 10-1 and the other insulating member 10-2 will be described concretely with reference to FIGS. 14 to 16. A total of four slot insulating films 10-1 (one slot insulating film 10-1 per one slot 9) and other insulating member 10-2 are used in the insulating process described above. The slot insulating film 10-1 is set to have the length S of the circumferential direction thereof so that each of the end portions in the circumferential direction has an overlapping portion of at least 1.5 mm or more. The slot insulating film 10-1 is also constructed to set the length J of the axial direction in a predetermined length of the width of the insulating film 10-1 corresponding to each of the outer circumferential portions of the central portion of the slot 9 (including the overlapping portion) and a predetermined length of the width corresponding to each of the inner circumferential portions of the central portion of the slot 9 to the thickness of the stator core 1 plus 3 mm or more (see FIG. 15). Thus, it is possible to ensure the insulation distance between the A phase winding 3 or the B phase winding 4 and the stator core 1 without inserting a special insulating wedge or the like to the outer and inner circumferential sides of the slot 9. Further, since the slot insulating film 10-1 is held by a holding portion 10a of the corresponding other insulating member 10-2, it is possible to prevent faults including dropout of the slot insulating film 10-1 (see FIG. 16). This makes it possible to reduce the possibility of occurrence of such a fault in assembling the stator 5. In this regard, although the holding portion 10a of the other insulating member 10-2 for holding the corresponding slot insulating film 10-1 is constructed so as to have a minimum size in the structure shown in the drawings, the holding portion 10a may have a structure so as to hold the whole circumference of the slot insulating film 10-1.

As described above, the present invention can provide a structure of an inner rotor type motor including a stator core that has four slots and a two-pole winding and a method of manufacturing the same which can simplify the structure and assembling work of a stator and improve quality in winding and a performance of the motor. Further, the present invention can be applied to any motor having a similar structure without relation to the output of the motor or an outside diameter of the stator.

What is claimed is:

1. A method of manufacturing a stator for an inner rotor type motor in which winding wire is wound on teeth of a stator core, the stator core being constructed from four divisional core elements and four divisional yoke elements, each of the four divisional core elements being integrally formed by setting up one tooth to one yoke portion, the method comprising the steps of:

providing an insulating member on the tooth of each of the four divisional core elements so that an inner surface of an other insulating member of the insulating member disposed on an inner surface of the yoke portion of each of the four divisional core elements is substantially perpendicular to the central axis of the corresponding tooth;

circularly fastening the four divisional core elements in a manner that the teeth are arranged substantially radially and in a regular placement that the four teeth are placed at the same positions as or similar positions to the regular dimensions for inside and outside diameters after completion of the stator for the inner rotor type motor, whereby a rotor opening is formed on top portions of the four teeth;

winding two-pole A phase winding and two-pole B phase winding on predetermined teeth in series and with concentrated winding; and following the winding step, forming four slots by respectively arranging the four divisional yoke elements between the yoke portions of the adjacent divisional core elements.

2. The method as claimed in claim 1, wherein the winding wire is wound on each of the teeth in an aligned manner.

3. The method as claimed in claim 1, wherein in the insulating member providing step slot insulating films and the other insulating members are used as the insulating member, and the slot insulating films provided on the slots are held during the winding step.

4. The method as claimed in claim 3, wherein each of the slot insulating films is constructed so that faults including dropout thereof are prevented by the other insulating members.

5. The method as claimed in claim 1, wherein in the insulating member providing step one slot insulating film is used for each of the four slots as the insulating member, an outer circumferential opening is arranged at the position where each of the divisional yoke elements is to be arranged in the fastening step, and both end portions of each of the slot insulating films are arranged near the center of the outer circumferential opening of the corresponding slot so that the adjacent end portions of each of the slot insulating films are overlapped with a predetermined length or more, and wherein the end portions of each of the slot insulating films are deformed outwardly from the rotor opening during the winding step.

6. The method as claimed in claim 5, wherein the end portions of each of the slot insulating films are overlapped and held after all the winding wire is completely wound.

7. The method as claimed in claim 1, wherein the winding wire is wound on each of the teeth so as not to protrude onto the position where each of the four divisional yoke elements is to be arranged.

* * * * *

UNITED STATES PATENT AND TRADEMARK OFFICE
CERTIFICATE OF CORRECTION

PATENT NO.        : 7,963,025 B2
APPLICATION NO.   : 12/007423
DATED             : June 21, 2011
INVENTOR(S)       : Shigeki Nishimura It is certified that error appears in the above-identified patent and that said Letters Patent is hereby corrected as shown below:

On the Title Page

Item (73) Assignee should read: -- Panasonic Corporation
                                   Kadoma-shi, Japan --

Item (30) Foreign Application Priority Data should read
          -- None --

Signed and Sealed this
Twenty-seventh Day of March, 2012

David J. Kappos
*Director of the United States Patent and Trademark Office*